(12) United States Patent
Koskinen et al.

(10) Patent No.: US 8,515,431 B2
(45) Date of Patent: Aug. 20, 2013

(54) METHODS AND APPARATUSES FOR FACILITATING TRIGGERED MOBILITY

(75) Inventors: Jussi-Pekka Koskinen, Oulu (FI); Lars Dalsgaard, Oulu (FI); Ilkka Antero Keskitalo, Oulu (FI)

(73) Assignee: Nokia Corporation, Espoo (FI)

( * ) Notice: Subject to any disclaimer, the term of this patent is extended or adjusted under 35 U.S.C. 154(b) by 32 days.

(21) Appl. No.: 13/073,273

(22) Filed: Mar. 28, 2011

(65) Prior Publication Data

US 2012/0252460 A1 Oct. 4, 2012

(51) Int. Cl.
*H04W 36/30* (2009.01)
(52) U.S. Cl.
USPC .......................................... 455/444; 455/438
(58) Field of Classification Search
USPC ........................... 455/444, 446, 447, 438, 450
See application file for complete search history.

(56) References Cited

U.S. PATENT DOCUMENTS

| | | | |
|---|---|---|---|
| 5,327,575 | A | 7/1994 | Menich et al. |
| 2008/0318572 | A1 | 12/2008 | Falaki et al. |
| 2010/0157948 | A1 | 6/2010 | Zeira et al. |
| 2010/0290435 | A1 | 11/2010 | Kazmi |

FOREIGN PATENT DOCUMENTS

| | | |
|---|---|---|
| EP | 2 190 236 A1 | 5/2010 |
| GB | 2 390 953 A | 1/2004 |
| WO | WO 2007/044281 A1 | 4/2007 |
| WO | WO 2010/053274 A2 | 5/2010 |

OTHER PUBLICATIONS

Alonso-Rubio, J., *Self-Optimization for Handover Oscillation Control in LTE*, IEEE/IFIP Network Operations and Management Symposium—NOMS 2010: Short Papers, (2010), pp. 950-953.
International Search Report and Written Opinion from International Application No. PCT/FI2012/050095, mailed May 11, 2012.
Zetterberg, K. et al., *Self-Optimisation of LTE Home Base Stations*, Research Paper, FP7 ICT-SOCRATES (undated), pp. 1-16; dated Feb. 18, 2009.

*Primary Examiner* — Sam Bhattacharya
(74) *Attorney, Agent, or Firm* — Alston & Bird LLP

(57) ABSTRACT

Methods and apparatuses are provided for facilitating triggered mobility. A method may include monitoring, at a mobile apparatus, a connection quality associated with a serving cell serving the mobile apparatus. The method may further include determining based at least in part on the monitored connection quality whether a predefined threshold connection quality condition has been satisfied. The predefined threshold connection quality condition may be indicative of potential inter-cell interference from a cell located within a coverage area of the serving cell. In an instance in which it is determined that the predefined threshold connection quality condition has been satisfied, the method may additionally include causing a report indicating that the predefined threshold connection quality condition has been satisfied to be sent to a network node associated with the serving cell. A corresponding apparatus is also provided.

20 Claims, 7 Drawing Sheets

METHODS AND APPARATUSES FOR FACILITATING TRIGGERED MOBILITY

TECHNOLOGICAL FIELD

Example embodiments of the present invention relate generally to communications technology and, more particularly, relate to methods and apparatuses for facilitating triggered mobility.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer and providing convenience to users.

Current and future networking technologies continue to facilitate ease of information transfer and convenience to users. In order to provide easier or faster information transfer and convenience, telecommunication industry service providers are developing improvements to existing networks. One development in networks is the provision for localized cells, such as femtocells and pico cells. These localized cells may be smaller in size compared to standard network operator controlled cells, referred to macro cells, which may provide coverage to a wider area. While localized cells may not provide seamless coverage over a wide area, when a mobile terminal is within a coverage area of a localized cell, the localized cell may accommodate offloading of network traffic, from the coverage layer of the mobile network provided by macro cells.

BRIEF SUMMARY

Systems, methods, apparatuses, and computer program products are herein provided for facilitating triggered mobility. Systems, methods, apparatuses, and computer program products in accordance with various example embodiments may provide several advantages to computing devices, computing device users, and network operators. In this regard, some example embodiments may provide for connection quality triggered mobility. More particularly, some example embodiments may provide a mobile apparatus configured to monitor a connection quality associated with a serving cell to determine whether a predefined threshold connection quality condition has been satisfied. The predefined threshold connection quality condition may be indicative of potential inter-cell interference from a cell located within a coverage area of the serving cell. In response to determination that the predefined threshold connection quality has been satisfied, the mobile apparatus of some example embodiments may inform a network node associated with the serving network.

Accordingly, some example embodiments provide for detection of proximity of a mobile apparatus to a cell, such as a localized cell, located within the coverage area of a serving cell based on detection by the mobile apparatus of inter-cell interference. Knowledge of the proximity of the mobile apparatus to the cell may be leveraged by some example embodiments to trigger a handover event. Accordingly, network traffic associated with the mobile apparatus may be advantageously offloaded from a coverage layer of the mobile network to a femtocell/pico cell layer. Further, a handover event performed in accordance such example embodiments may reduce, or even eliminate, inter-cell interference that may be encountered by the mobile apparatus and/or by the localized cell.

In a first example embodiment, a method is provided, which may comprise monitoring, at a mobile apparatus, a connection quality associated with a serving cell serving the mobile apparatus. The method of this example embodiment may further comprise determining based at least in part on the monitored connection quality whether a predefined threshold connection quality condition has been satisfied. The predefined threshold connection quality condition of this example embodiment may be indicative of potential inter-cell interference from a cell located within a coverage area of the serving cell. In an instance in which it is determined that the predefined threshold connection quality condition has been satisfied, the method of this example embodiment may additionally comprise causing a report indicating that the predefined threshold connection quality condition has been satisfied to be sent to a network node associated with the serving cell.

In another example embodiment, an apparatus comprising at least one processor and at least one memory storing computer program code is provided. The at least one memory and stored computer program code may be configured, with the at least one processor, to cause the apparatus of this example embodiment to at least monitor a connection quality associated with a serving cell serving the apparatus. The at least one memory and stored computer program code may be configured, with the at least one processor, to further cause the apparatus of this example embodiment to determine based at least in part on the monitored connection quality whether a predefined threshold connection quality condition has been satisfied. The predefined threshold connection quality condition of this example embodiment may be indicative of potential inter-cell interference from a cell located within a coverage area of the serving cell. The at least one memory and stored computer program code may be configured, with the at least one processor, to further cause the apparatus of this example embodiment, in an instance in which it is determined that the predefined threshold connection quality condition has been satisfied, to cause a report indicating that the predefined threshold connection quality condition has been satisfied to be sent to a network node associated with the serving cell.

In a further example embodiment, a computer program product is provided. The computer program product of this example embodiment includes at least one computer-readable storage medium having computer-readable program instructions stored therein. The program instructions of this example embodiment may comprise program instructions configured to monitor, at a mobile apparatus, a connection quality associated with a serving cell serving the mobile apparatus. The program instructions of this example embodiment may further comprise program instructions configured to determine based at least in part on the monitored connection quality whether a predefined threshold connection quality condition has been satisfied. The predefined threshold connection quality condition of this example embodiment may be indicative of potential inter-cell interference from a cell located within a coverage area of the serving cell. The program instructions of this example embodiment may additionally comprise program instructions configured, in an instance in which it is determined that the predefined threshold connection quality condition has been satisfied, to cause a report indicating that the predefined threshold connection quality condition has been satisfied to be sent to a network node associated with the serving cell.

In another example embodiment, an apparatus is provided that may comprise means for monitoring a connection quality associated with a serving cell serving the apparatus. The apparatus of this example embodiment may further comprise means for determining based at least in part on the monitored connection quality whether a predefined threshold connection quality condition has been satisfied. The predefined threshold connection quality condition of this example embodiment may be indicative of potential inter-cell interference from a cell located within a coverage area of the serving cell. The apparatus of this example embodiment may further comprise means for, in an instance in which it is determined that the predefined threshold connection quality condition has been satisfied, causing a report indicating that the predefined threshold connection quality condition has been satisfied to be sent to a network node associated with the serving cell.

In a further example embodiment, a method is provided, which may comprise receiving a report sent by a mobile apparatus indicating that the mobile apparatus has determined that a predefined threshold connection quality condition has been satisfied with respect to a connection quality associated with a serving cell serving the mobile apparatus. The predefined threshold connection quality condition of this example embodiment may be indicative of potential inter-cell interference from a cell located within a coverage area of the serving cell. The method of this example embodiment may further comprise determining, based at least in part on the report, whether to trigger a handover procedure to handover the mobile apparatus.

In another example embodiment, an apparatus comprising at least one processor and at least one memory storing computer program code is provided. The at least one memory and stored computer program code may be configured, with the at least one processor, to cause the apparatus of this example embodiment to at least receive a report sent by a mobile apparatus indicating that the mobile apparatus has determined that a predefined threshold connection quality condition has been satisfied with respect to a connection quality associated with a serving cell serving the mobile apparatus. The predefined threshold connection quality condition of this example embodiment may be indicative of potential inter-cell interference from a cell located within a coverage area of the serving cell. The at least one memory and stored computer program code may be configured, with the at least one processor, to further cause the apparatus of this example embodiment to determine, based at least in part on the report, whether to trigger a handover procedure to handover the mobile apparatus.

In yet another example embodiment, a computer program product is provided. The computer program product of this example embodiment includes at least one computer-readable storage medium having computer-readable program instructions stored therein. The program instructions of this example embodiment may comprise program instructions configured to receive a report sent by a mobile apparatus indicating that the mobile apparatus has determined that a predefined threshold connection quality condition has been satisfied with respect to a connection quality associated with a serving cell serving the mobile apparatus. The predefined threshold connection quality condition of this example embodiment may be indicative of potential inter-cell interference from a cell located within a coverage area of the serving cell. The program instructions of this example embodiment may further comprise program instructions configured to determine, based at least in part on the report, whether to trigger a handover procedure to handover the mobile apparatus.

In still a further example embodiment, an apparatus is provided that may comprise means for receiving a report sent by a mobile apparatus indicating that the mobile apparatus has determined that a predefined threshold connection quality condition has been satisfied with respect to a connection quality associated with a serving cell serving the mobile apparatus. The predefined threshold connection quality condition of this example embodiment may be indicative of potential inter-cell interference from a cell located within a coverage area of the serving cell. The apparatus of this example embodiment may further comprise means for determining, based at least in part on the report, whether to trigger a handover procedure to handover the mobile apparatus.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
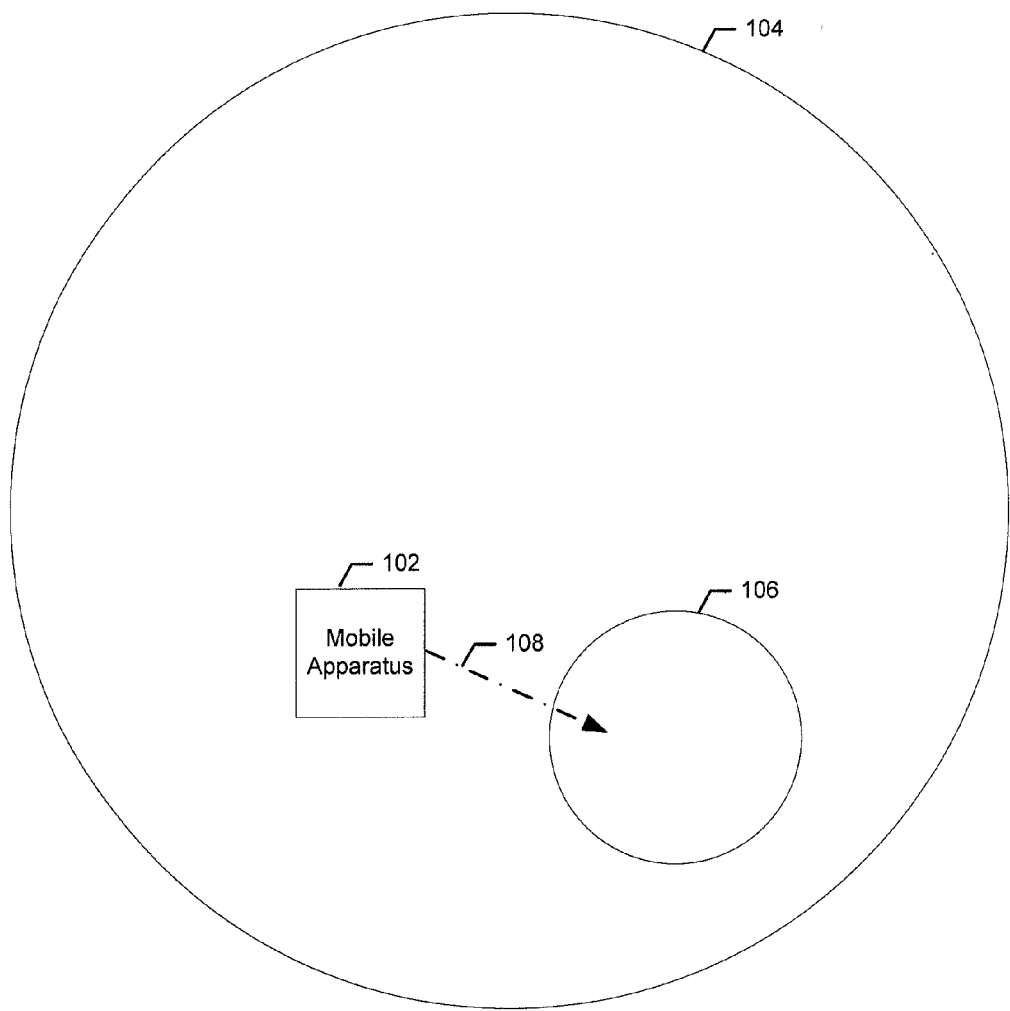
FIG. 1 illustrates an example of inter-cell interference according to some example embodiments.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

With current deployment of localized cells, such as home cells and other femtocells, network support for mobility may be very limited. The current assumption is that mobile apparatuses autonomously detect if they are in the vicinity of a home cell (if this is located on same or separate carrier). If a home cell is found, the mobile apparatus may also have to check if it has access to that particular cell by comparing a stored White List of closed subscriber group (CSG) identifications (IDs) for cells to which the mobile apparatus has access with the CSG id of the detected cell. This detection, however, may be problematic. For example, there may be a detection delay. There is not a standardized autonomous CSG cell search used for detecting the home cells. As such, performance of the autonomous search is implementation dependent.

Accordingly, some example embodiments provided herein may advantageously improve mobility of a mobile apparatus, such as to facilitate mobility of a mobile apparatus from a macro cell to a localized cell, when available. More particularly, some example embodiments may facilitate connection quality triggered mobility. In this regard, in some scenarios, there may be interference, especially when macro and localized (e.g., femtocells, pico cells, micro cells, and/or the like) cell layers operate on the same or similar frequencies, referred to as co-channel deployment. One such scenario is when a mobile apparatus served by a macro cell, referred to as a macro cell user equipment (MUE), approaches a localized cell (e.g., a femtocell, pico cell, micro cell, or other localized cell) located within a coverage area of the serving macro cell. In this scenario, the MUE may experience increasing downlink (DL) co-channel interference from the localized cell as it approaches the localized cell. Similarly, if the MUE is actively transmitting data, the receiver for the localized cell may experience uplink (UL) interference due to UL transmission by the MUE as the MUE approaches the receiver. In such situation the serving cell signal level may be sufficiently high for successful detection without excessive interference. This situation may be an indication that the localized cell is within the coverage area of the macro cell.

Referring now to FIG. 1, FIG. 1 illustrates an example of inter-cell interference according to some example embodiments. It will be appreciated that the elements illustrated in FIG. 1 are not necessarily drawn to scale, but rather are provided for purposes of illustrative example. In the example of FIG. 1, a mobile apparatus 102 is located in a coverage area of a cell 104. The cell 104 may comprise a serving cell serving the mobile apparatus 102, such as by providing a network connection and/or other network service to the mobile apparatus 102. In this regard, the mobile apparatus 102 may be connected to the cell 104 in radio resource control (RRC) connected mode. The cell 104 may, for example comprise a macro cell. One or more localized cells (e.g., femtocells, pico cells, and/or the like) may be located within the coverage area of the cell 104. One such localized cell 106 is illustrated in FIG. 1. The mobile apparatus 102 may travel along a path 108 toward the localized cell 106. As the mobile apparatus 102 approaches the localized cell 106, inter-cell interference may occur, resulting in the mobile apparatus 102 experiencing degraded connection quality.

Figure 2:
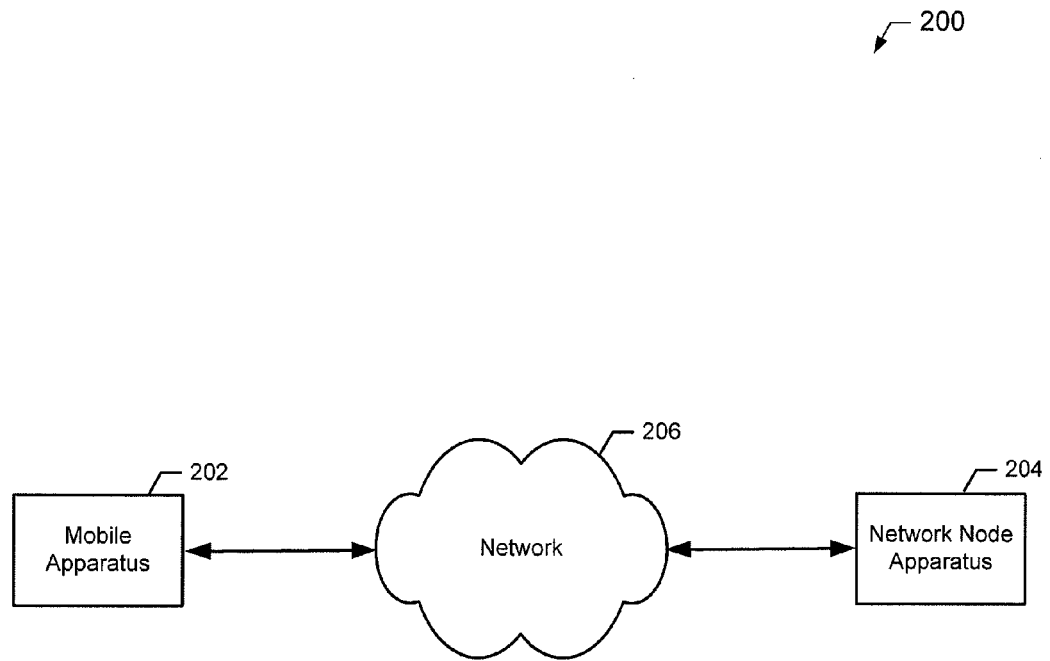
FIG. 2 illustrates a system for facilitating triggered mobility according to some example embodiments.

As will be described further herein below, some example embodiments provide for detection of such inter-cell interference as an indication of a proximity of a localized cell. Such example embodiments may facilitate mobility from the serving cell to the localized cell (E.g., from the cell 104 to the cell 106) in response to detection of the interference. Referring now to FIG. 2, FIG. 2 illustrates a block diagram of a system 200 for facilitating triggered mobility according to some example embodiments. It will be appreciated that the system 200 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 2 illustrates one example of a configuration of a system for facilitating triggered mobility, numerous other configurations may also be used to implement embodiments of the present invention.

In at least some embodiments, the system 200 includes a mobile apparatus 202 and network node apparatus 204. The mobile apparatus 202 and network node apparatus 204 may be configured to communicate over the network 206. The network 206 may comprise one or more wireless networks (for example, a cellular network, wireless local area network, wireless personal area network, wireless metropolitan area network, and/or the like), one or more wireline networks, a wireless link (e.g., a radio link or other interface between a mobile apparatus and a network access point), or some combination thereof, and in some embodiments may comprise at least a portion of the interne.

The mobile apparatus 202 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like.

The network node apparatus 204 may be embodied as one or more servers, a server cluster, a cloud computing infrastructure, one or more desktop computers, one or more laptop computers, one or more mobile computers, one or more network nodes, multiple computing devices in communication with each other, a chipset, an apparatus comprising a chipset, any combination thereof, and/or the like. In some example embodiments, the network node apparatus 204 may comprise an access point, such as an evolved Node B (eNB), base station, or the like. In other example embodiments, the network node apparatus 204 may, for example, comprise a radio network controller (RNC). In further example embodiments, the network node apparatus 204 may comprise both an access point and an RNC. More particularly, the network node apparatus 204 may comprise any apparatus comprising one or more computing devices, which is associated with a cell (e.g., the cell 104) serving the mobile apparatus 202, which may be configured receive a report from the mobile apparatus 202 and trigger a handover procedure of the mobile apparatus 202, such as to a localized cell (e.g., the cell 106), as will be describe further herein below.

Figure 3:
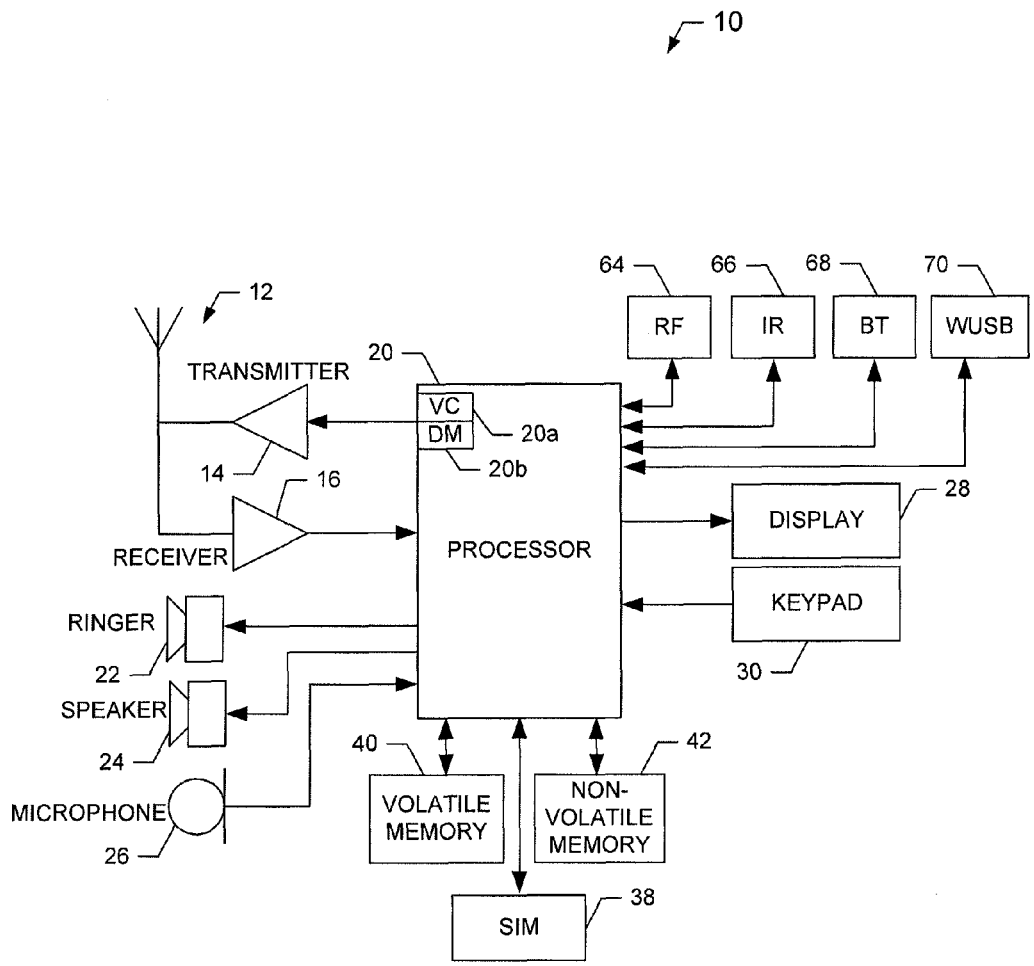
FIG. 3 is a schematic block diagram of a mobile terminal according to some example embodiments.

In some example embodiments, the mobile apparatus 202 may be embodied as a mobile terminal, such as that illustrated in FIG. 3. In this regard, FIG. 3 illustrates a block diagram of a mobile terminal 10 representative of some example embodiments of a mobile apparatus 202. It should be understood, however, that the mobile terminal 10 illustrated and hereinafter described is merely illustrative of one type of mobile apparatus 202 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), any future communication protocol, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols, such as LTE-Advanced (LTE-A), and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 3, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 4:
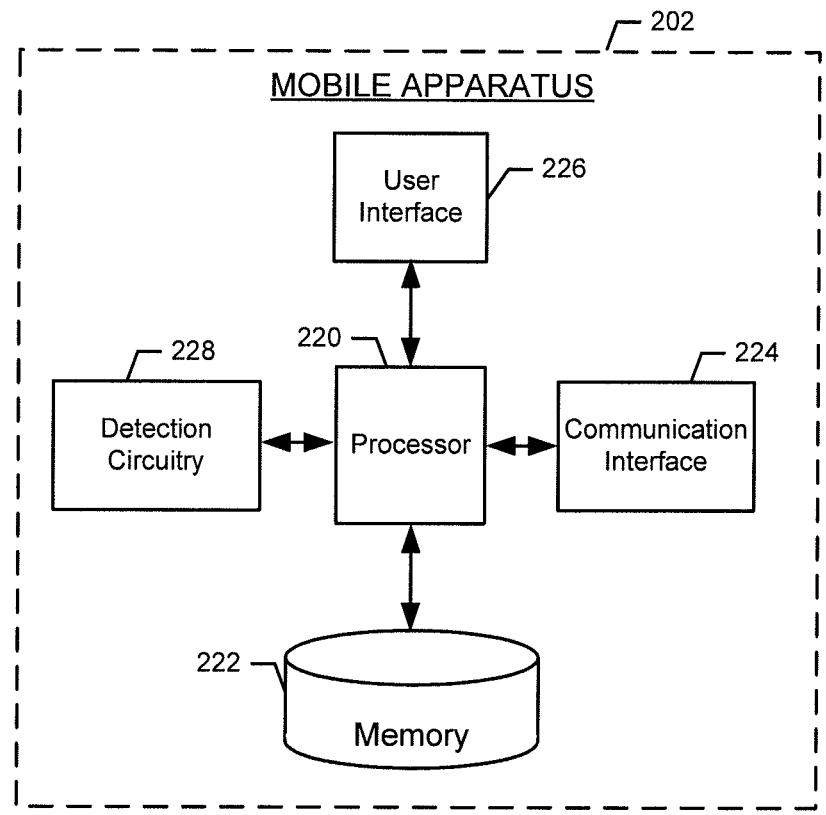
FIG. 4 illustrates a block diagram of a mobile apparatus according to some example embodiments.

Referring now to FIG. 4, FIG. 4 illustrates a block diagram of a mobile apparatus 202 according to some example embodiments. As illustrated in FIG. 4, the mobile apparatus 202 may include various means for performing the various functions herein described. These means may comprise one or more of a processor 220, memory 222, communication interface 224, user interface 226, or detection circuitry 228. The means of the mobile apparatus 202 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 222) that is executable by a suitably configured processing device (for example, the processor 220), or some combination thereof.

In some example embodiments, one or more of the means illustrated in FIG. 4 may be embodied as a chip or chip set. In other words, the mobile apparatus 202 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 220, memory 222, communication interface 224, user interface 226, and/or detection circuitry 228 may be embodied as a chip or chip set. The mobile apparatus 202 may therefore, in some example embodiments, be configured to implement embodiments of the present invention on a single chip or as a single "system on a chip." As another example, in some example embodiments, the mobile apparatus 202 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 220 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 220 may comprise a plurality of processors. The plurality of processors may be in operative communication with each other and may be collectively configured to perform one or more functionalities of the mobile apparatus 202 as described herein. The plurality of processors may be embodied on a single computing device or distributed across a plurality of computing devices collectively configured to function as the mobile apparatus 202. In embodiments wherein the mobile apparatus 202 is embodied as a mobile terminal 10, the processor 220 may be embodied as or comprise the processor 20. In some example embodiments, the processor 220 may be configured to execute instructions stored in the memory 222 or otherwise accessible to the processor 220. These instructions, when executed by the processor 220, may cause the mobile apparatus 202 to perform one or more of the functionalities of the mobile apparatus 202 as described herein. As such, whether configured by hardware or software methods, or by a combination thereof, the processor 220 may comprise an entity capable of performing operations according to one or more example embodiments of the present invention while configured accordingly. Thus, for example, when the processor 220 is embodied as an ASIC, FPGA or the like, the processor 220 may comprise specifically configured hardware for conducting one or more operations described herein. Alternatively, as another example, when the processor 220 is embodied as an executor of instructions, such as may be stored in the memory 222, the instructions may specifically configure the processor 220 to perform one or more algorithms and operations described herein.

The memory 222 may comprise, for example, volatile memory, non-volatile memory, or some combination thereof. In this regard, the memory 222 may comprise a non-transitory computer-readable storage medium. Although illustrated in FIG. 4 as a single memory, the memory 222 may comprise a plurality of memories. The plurality of memories may be embodied on a single computing device or may be distributed across a plurality of computing devices collectively configured to function as the mobile apparatus 202. In various example embodiments, the memory 222 may comprise a hard disk, random access memory, cache memory, flash memory, a compact disc read only memory (CD-ROM), digital versatile disc read only memory (DVD-ROM), an optical disc, circuitry configured to store information, or some combination thereof. In some example embodiments wherein the mobile apparatus 202 is embodied as a mobile terminal 10, the memory 222 may comprise the volatile memory 40 and/or the non-volatile memory 42. The memory 222 may be configured to store information, data, applications, instructions, or the like for enabling the mobile apparatus 202 to carry out various functions in accordance with various example embodiments. For example, in some example embodiments, the memory 222 is configured to buffer input data for processing by the processor 220. Additionally or alternatively, the memory 222 may be configured to store program instructions for execution by the processor 220. The memory 222 may store information in the form of static and/or dynamic information. This stored information may be stored and/or used by the detection circuitry 228 during the course of performing its functionalities.

The communication interface 224 may be embodied as any device or means embodied in circuitry, hardware, a computer program product comprising computer readable program instructions stored on a computer readable medium (for example, the memory 222) and executed by a processing device (for example, the processor 220), or a combination thereof that is configured to receive and/or transmit data from/to another computing device. In an example embodiment, the communication interface 224 is at least partially embodied as or otherwise controlled by the processor 220. In this regard, the communication interface 224 may be in communication with the processor 220, such as via a bus. The communication interface 224 may include, for example, an antenna, a transmitter, a receiver, a transceiver and/or supporting hardware or software for enabling communications with one or more remote computing devices. The communication interface 224 may be configured to receive and/or transmit data using any protocol that may be used for communications between computing devices. In this regard, the communication interface 224 may be configured to receive and/or transmit data using any protocol that may be used for transmission of data over a wireless network, wireline network, some combination thereof, or the like by which the mobile apparatus 202 and one or more computing devices or computing resources may be in communication. As an example, the communication interface 224 may be configured to enable communication between the mobile apparatus 202 and the network node apparatus 204 over a network (for example, the network 106). The communication interface 224 may additionally be in communication with the memory 222, user interface 226, and/or detection circuitry 228, such as via a bus.

The user interface 226 may be in communication with the processor 220 to receive an indication of a user input and/or to provide an audible, visual, mechanical, or other output to a user. As such, the user interface 226 may include, for example, a keyboard, a mouse, a joystick, a display, a touch screen display, a microphone, a speaker, and/or other input/output mechanisms. In embodiments wherein the user interface 226 comprises a touch screen display, the user interface 226 may additionally be configured to detect and/or receive an indication of a touch gesture or other input to the touch screen display. The user interface 226 may be in communication with the memory 222, communication interface 224, and/or detection circuitry 228, such as via a bus.

The detection circuitry 228 may be embodied as various means, such as circuitry, hardware, a computer program product comprising computer readable program instructions stored on a computer readable medium (for example, the memory 222) and executed by a processing device (for example, the processor 220), or some combination thereof and, in some embodiments, is embodied as or otherwise controlled by the processor 220. In some example embodiments wherein the detection circuitry 228 is embodied separately from the processor 220, the detection circuitry 228 may be in communication with the processor 220. The detection circuitry 228 may further be in communication with one or more of the memory 222, communication interface 224, or user interface 226, such as via a bus.

Figure 5:
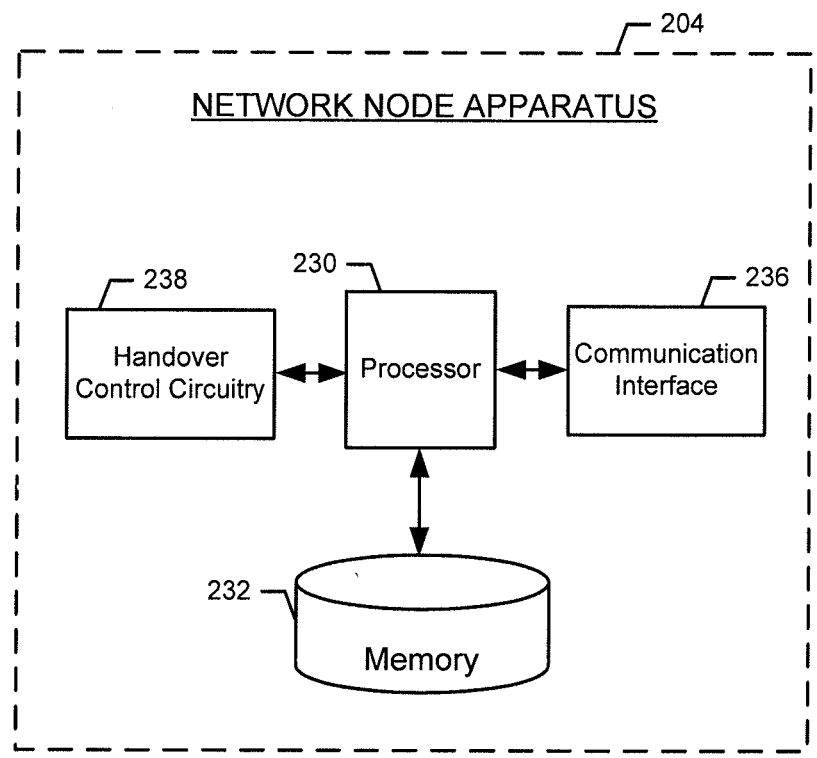
FIG. 5 illustrates a block diagram of a network node apparatus according to some example embodiments.

FIG. 5 illustrates a block diagram of a network node apparatus 204 according to an example embodiment. As illustrated in FIG. 5, the network node apparatus 204 may include one or more means for performing the various functions herein described. These means may comprise one or more of a processor 230, memory 232, communication interface 236, or handover control circuitry 238. The means of the network node apparatus 204 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 232) that is executable by a suitably configured processing device (for example, the processor 230), or some combination thereof.

In some example embodiments, one or more of the means illustrated in FIG. 5 may be embodied as a chip or chip set. In other words, the network node apparatus 204 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 230, memory 232, communication interface 236, and/or handover control circuitry 238 may be embodied as a chip or chip set. The network node apparatus 204 may therefore, in some example embodiments, be configured to implement embodiments of the present invention on a single chip or as a single "system on a chip." As another example, in some example embodiments, the network node apparatus 204 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 230 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 5 as a single processor, in some embodiments the processor 230 comprises a plurality of processors. The plurality of processors may be in operative communication with each other and may be collectively configured to perform one or more functionalities of the network node apparatus 204 as described herein. The plurality of processors may be embodied on a single computing device or distributed across a plurality of computing devices collectively configured to function as the network node apparatus 204. In some example embodiments, the processor 230 is configured to execute instructions stored in the memory 232 or otherwise accessible to the processor 230. These instructions, when executed by the processor 230, may cause the network node apparatus 204 to perform one or more of the functionalities of the network node apparatus 204 as described herein. As such, whether configured by hardware or software methods, or by a combination thereof, the processor 230 may comprise an entity capable of performing operations according to embodiments of the present invention while configured accordingly. Thus, for example, when the processor 230 is embodied as an ASIC, FPGA or the like, the processor 230 may comprise specifically configured hardware for conducting one or more operations described herein. Alternatively, as another example, when the processor 230 is embodied as an executor of instructions, such as may be stored in the memory 232, the instructions may specifically configure the processor 230 to perform one or more algorithms and operations described herein.

The memory 232 may comprise, for example, volatile memory, non-volatile memory, or some combination thereof. In this regard, the memory 232 may comprise a non-transitory computer-readable storage medium. Although illustrated in FIG. 5 as a single memory, the memory 232 may comprise a plurality of memories. The plurality of memories may be embodied on a single computing device or may be distributed across a plurality of computing devices collectively configured to function as the network node apparatus 204. In various example embodiments, the memory 232 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 232 may be configured to store information, data, applications, instructions, or the like for enabling the network node apparatus 204 to carry out various functions in accordance with various example embodiments. For example, in some example embodiments, the memory 232 is configured to buffer input data for processing by the processor 230. Additionally or alternatively, the memory 232 may be configured to store program instructions for execution by the processor 230. The memory 232 may store information in the form of static and/or dynamic information. The stored information may, for example, include one or more maps and/or portions thereof. This stored information may be stored and/or used by the handover control circuitry 238 during the course of performing its functionalities.

The communication interface 236 may be embodied as any device or means embodied in circuitry, hardware, a computer program product comprising computer readable program instructions stored on a computer readable medium (for example, the memory 232) and executed by a processing device (for example, the processor 230), or a combination thereof that is configured to receive and/or transmit data from/to another computing device. In some example embodiments, the communication interface 236 is at least partially embodied as or otherwise controlled by the processor 230. In this regard, the communication interface 236 may be in communication with the processor 230, such as via a bus. The communication interface 236 may include, for example, an antenna, a transmitter, a receiver, a transceiver and/or supporting hardware or software for enabling communications with one or more remote computing devices. The communication interface 236 may be configured to receive and/or transmit data using any protocol that may be used for communications between computing devices. In this regard, the communication interface 236 may be configured to receive and/or transmit data using any protocol that may be used for transmission of data over a wireless network, wireline network, some combination thereof, or the like by which the network node apparatus 204 and one or more computing devices or computing resources may be in communication. As an example, the communication interface 236 may be configured to enable communication between the network node apparatus 204 and the mobile apparatus 202 over a network (for example, the network 106). The communication interface 236 may additionally be in communication with the memory 232 and/or handover control circuitry 238, such as via a bus.

The handover control circuitry 238 may be embodied as various means, such as circuitry, hardware, a computer program product comprising computer readable program instructions stored on a computer readable medium (for example, the memory 232) and executed by a processing device (for example, the processor 230), or some combination thereof and, in some embodiments, is embodied as or otherwise controlled by the processor 230. In some embodiments wherein the handover control circuitry 238 is embodied separately from the processor 230, the handover control circuitry 238 may be in communication with the processor 230. The handover control circuitry 238 may further be in communication with one or more of the memory 232 or communication interface 236, such as via a bus.

The mobile apparatus 202 may be connected (e.g., in RRC connected mode) to a serving cell, such as the cell 104. The mobile apparatus 202 may be configured with a predefined threshold connection quality condition. Satisfaction of the threshold connection quality condition may indicate a potential of inter-cell interference from a cell (e.g., a localized cell, such as the cell 106) located within the coverage area of the serving cell. The threshold connection quality condition may, for example, be configured by a network operator, a manufacturer of the mobile apparatus 202, and/or the like. In some example embodiments, the threshold connection quality condition may be configured for the mobile apparatus 202 by the handover control circuitry 238. The threshold connection quality condition may be configured on a network-wide basis, may be configured on a per cell basis (e.g., upon connection to a cell), and/or the like. As an example, the handover control circuitry 238 may configure the threshold connection quality condition via setup signaling, such as when the mobile apparatus 202 connects to the cell, when the mobile apparatus 202 is handed over to the cell, and/or the like.

While connected to the cell, the detection circuitry 228 may monitor a connection quality associated with the serving cell. The detection circuitry 228 may perform the monitoring in any manner, including, for example, continuously, periodically, or aperiodically. The detection circuitry 228 may be further configured to determine based at least in part on the monitored connection quality whether the predefined threshold connection quality condition has been satisfied.

As an example, in some example embodiments, the threshold connection quality condition may comprise a threshold quality deviation. In this regard inter-cell interference resulting from proximity to a localized cell may be indicated by a degraded channel quality, such as may be measured by a channel quality indicator (CQI) value, while a serving cell signal level, such as reference signal received power (RSRP) may remain substantially the same. This condition may result because while RSRP may decrease as a UE approaches an edge of the coverage area of the serving cell, a localized cell located within the coverage area of the serving cell may not be on the cell edge and, as such, the RSRP may remain relatively constant when the mobile apparatus 102 approaches the localized cell even when inter-cell interference may cause degradation of the CQI value. Accordingly, in monitoring the connection quality, the detection circuitry 228 may be configured to measure a channel quality indication associated with the serving cell. This channel quality indication may, for example, comprise a CQI value. However, it will be appreciated that other channel quality indications may be measured in addition to or in lieu of CQI. For example, reference signal received quality (RSRQ) may be monitored in some example embodiments. The detection circuitry 228 may further measure a received power level of a received signal transmitted by an access point for the serving cell. The measured received power level may, for example, comprise a measured RSRP or other indication of a DL signal level.

The detection circuitry 228 may be configured to compare the measured channel quality indication to the measured received power level to determine a quality deviation between the measured channel quality indication and the measured received power level. If the quality deviation satisfies a threshold quality deviation, the detection circuitry 228 may determine that the predefined threshold connection quality condition has been satisfied.

As another example, in some example embodiments, the threshold connection quality condition may comprise a threshold change in channel quality. In this regard, as a mobile apparatus approaches the edge of a coverage area of a serving cell, it may be expected that the channel quality may degrade gradually. However, if a mobile apparatus 202 approaches a localized cell located within the coverage area of the serving cell, the channel quality may instead change rather abruptly. Accordingly, in some example embodiments, the detection circuitry 228 may be configured to monitor the channel quality by monitoring for a change in channel quality indication associated with the serving cell. In this regard, the detection circuitry 228 may be configured to measure first and second channel quality indications (e.g., first and second CQI values). The second channel quality indication may be measured subsequent to the first channel quality indication. The detection circuitry 228 may compare the first channel quality indication to the second channel quality indication to determine a change in channel quality (e.g., delta-CQI) between the first channel quality indication and the second channel quality indication. If the change in channel quality satisfies a threshold change in channel quality, the detection circuitry 228 may determine that the predefined threshold connection quality condition has been satisfied. In this regard, for example, if a change in channel quality between consecutive channel quality measurements exceeds a threshold, the detection circuitry 228 may determine that the threshold connection quality condition has been satisfied. As another example, if a change in channel quality over a period of time exceeds a predefined threshold tolerated change in channel quality over the period of time, the detection circuitry 228 may determine that the threshold connection quality condition has been satisfied. As still a further example, if a change in channel quality over a distance traveled by the mobile apparatus 202 exceeds a predefined threshold tolerated change in channel quality over the distance, the detection circuitry 228 may determine that the threshold connection quality condition has been satisfied.

In some example embodiments, multiple threshold connection quality conditions may be predefined for the mobile apparatus 202. In some such example embodiments, the detection circuitry 228 may check each of the threshold connection quality conditions to determine whether any of the threshold connection quality conditions have been satisfied. Accordingly, for example, the mobile apparatus 202 may be configured with both a threshold quality deviation and a threshold change in channel quality.

If the detection circuitry 228 determines that a threshold connection quality condition has been satisfied, the detection circuitry 228 may cause the mobile apparatus 202 to send a report indicating that the predefined threshold channel quality condition has been satisfied to the network node apparatus 204. The report may, for example, comprise a predefined indication, format, and/or the like that may be understood by the handover control circuitry 238 to indicate that the mobile apparatus 202 has determined that a threshold connection quality condition has been satisfied. The report may further include one or more values that may have been measured and/or calculated by the mobile apparatus 202 in determining that the threshold connection quality condition has been satisfied. For example, the report may include one or more of a CQI value, reference signal received power (RSRP) value, reference signal received quality (RSRQ) value, a change in CQI value (delta-CQI), a deviation between a measured CQI and a measured RSRP, a ratio of a measured CQI and a measured RSRP, come combination thereof, or the like.

The handover control circuitry 238 may determine based on the received report whether to trigger a handover procedure to handover the mobile apparatus 102, such as from the serving cell to a cell causing inter-cell interference. In this regard, in some example embodiments, the handover control circuitry 238 may assume based on the report that the mobile apparatus 102 is encountering inter-cell interference from a localized cell and may determine to trigger a handover procedure. Alternatively, in some example embodiments, the handover control circuitry 238 may verify that the mobile apparatus 202 is encountering inter-cell interference and not some other interference or anomaly prior to triggering a handover procedure.

For example, the handover control circuitry 238 may determine a location of the mobile apparatus 202, such as based on a time advance value known or otherwise available to the network node apparatus 204. The handover control circuitry 238 may determine whether the location of the mobile apparatus 202 is within proximity (e.g., a predefined proximity) of a known location of a cell located within the coverage area of the serving cell. In this regard, the handover control circuitry 238 may know of one or more cells located within the coverage area of the serving cell and their respective locations. Accordingly, the handover control circuitry 238 may use this knowledge and a location of the mobile apparatus 202 to verify that the channel quality condition reported by the mobile apparatus 202 is caused by inter-cell interference.

As another example, the handover control circuitry 238 may have access to statistical data of expected or typical connection quality values and/or relationships there between. This statistical data may, for example, have been collected for the serving cell. As an example, the statistical data may describe a typical or expected relation between signal levels (e.g., RSRP) and a channel quality indication value (e.g., a CQI value). Accordingly, the handover control circuitry 238 may compare one or more connection quality values that may have been included in the report received from the mobile apparatus 202 to the statistical data. If there is a large enough variance (e.g., at least a threshold level of variance) between the reported values measured by the mobile apparatus 202 and the expected or typical values, the handover control circuitry 238 may determine that the connection quality condition experienced and reported by the mobile apparatus 202 is due to inter-cell interference.

As still a further example, the handover control circuitry 238 may perform verification measurements on the network side. For example, the report received by the network node apparatus 204 may include a channel quality indication value (e.g., a CQI value) measured by the mobile apparatus 202. The handover control circuitry 238 may compare the channel quality indication value to an uplink (UL) signal level that may have been measured by a network entity, such as an access point for the serving cell. If a deviation between the reported channel quality and the measured UL signal level satisfies (e.g., exceeds) a threshold deviation or varies from an expected or typical deviation, the handover control circuitry 238 may determine that the connection quality condition experienced and reported by the mobile apparatus 202 is due to inter-cell interference.

As yet another example, the handover control circuitry 238 may determine (e.g., estimate) a velocity of the mobile apparatus 202. If the determined velocity exceeds a predefined threshold, the handover control circuitry 238 may determine to not trigger a handover to a localized cell causing inter-cell interference. In this regard, if the estimated velocity is high enough, it may be concluded that the mobile apparatus 202 is just passing by or through the localized cell and it is not necessary to perform a handover because the inter-cell interference may abate in a relatively short period. As an example, if a user is driving in a car at a high rate of speed, the car, and thus the user's mobile apparatus 202 may pass the localized cell relatively quickly. However, if the user is a pedestrian, the user may be within the vicinity of the localized cell for a longer period of time. In this scenario, the velocity of the mobile apparatus 202 may be less than a predefined threshold and the handover control circuitry 238 may determine to perform a handover, such as to the localized cell.

Further, it will be appreciated, that the handover control circuitry 238 is not limited to triggering a handover to the localized cell. In this regard, a handover may also be triggered to another frequency (e.g., to a cell operating on another frequency), which may be assumed or known to not be affected by (e.g., "clean" from) the co-channel interference. In some example embodiments, the handover control circuitry 238 may have knowledge of the localized cell and/or may be aware of such a carrier frequency. Accordingly, network node apparatus 202 may have access to pre-configured measurements to facilitate such a handover In some example embodiments, the detection circuitry 228 may be configured to determine an identity of a cell that is potentially causing inter-cell interference. In this regard, the detection circuitry 228 may be aware of an identity of a cell in the vicinity of the mobile apparatus 202. Alternatively, the detection circuitry 228 may ascertain the identity of a cell (e.g., a localized cell) proximate to the mobile apparatus 202 in response to determining that a predefined threshold connection quality condition has been satisfied. The detection circuitry 228 may include the possible interfering cell identification in the report sent to the network node apparatus 204. In such example embodiments, the handover control circuitry 238 may be configured to use the possible interfering cell identification as a basis for verifying that the connection quality condition experienced and reported by the mobile apparatus 202 is due to inter-cell interference. Additionally or alternatively, the handover control circuitry 238 may be configured to use the possible interfering cell identification to facilitate handover of the mobile apparatus 202 to the interfering cell.

In triggering a handover of the mobile apparatus 202 (e.g., from a macro cell, such as the cell 104, to an interfering localized cell, such as the cell 106), the handover control circuitry 238 may be configured to use any appropriate handover procedure. In some instances, the handover control circuitry 238 may request that the mobile apparatus 202 redefine or otherwise make appropriate measurements to facilitate handover. In instances wherein the mobile apparatus 202 redefines the measurements, the detection circuitry 228 may evaluate the redefined measurements to ensure that performance of a handover is merited before triggering the handover. The detection circuitry 228 may accordingly engage in a handover procedure triggered by the network node apparatus 204, and may act under the supervision and/or instruction of the network node apparatus 204.

In instances wherein the cell to which the network operator of the serving cell controls and/or is aware of the cell to which the mobile apparatus 202 is to be handed over, the handover control circuitry 238 may be able to exchange information with the cell. For example, in some example embodiments, if the mobile apparatus 202 is to be handed over from a serving macro cell to a pico cell, information may be exchanged between the cells of macro and pico layers in order to actively support mobility. In this regard, there may be X2 interfaces between pico cells as well as between pico and macro cells. Accordingly, the handover control circuitry 238 may, in some instances, communicate with the cell to which the mobile apparatus 202 is being handed over in order to facilitate the handover procedure.

Figure 6:
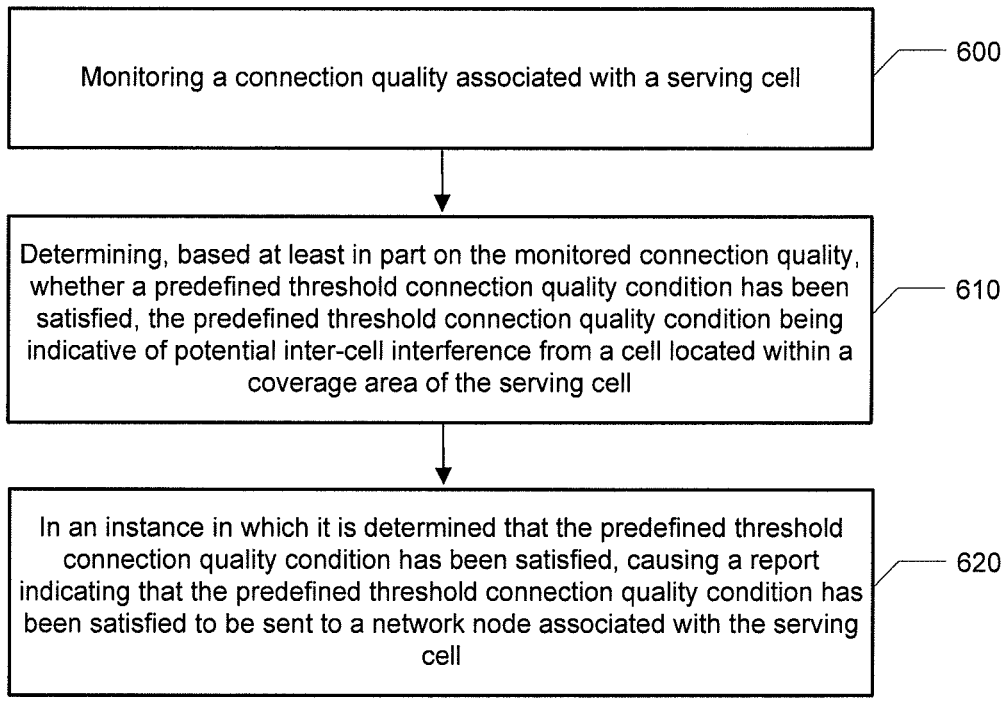
FIG. 6 illustrates a flowchart according to an example method for facilitating triggered mobility according to some example embodiments.

FIG. 6 illustrates a flowchart according to an example method for facilitating triggered mobility in accordance with some example embodiments. In this regard, FIG. 6 illustrates operations that may be performed at the mobile apparatus 202. The operations illustrated in and described with respect to FIG. 6 may, for example, be performed by, with the assistance of, and/or under the control of one or more of the processor 220, memory 222, communication interface 224, user interface 226, or detection circuitry 228. Operation 600 may comprise monitoring a connection quality associated with a serving cell. The processor 220, memory 222, communication interface 224, and/or detection circuitry 228 may, for example, provide means for performing operation 600. Operation 610 may comprise determining, based at least in part on the monitored connection quality, whether a predefined threshold connection quality condition has been satisfied. The predefined threshold connection quality condition may be indicative of potential inter-cell interference from a cell located within a coverage area of the serving cell. The processor 220, memory 222, and/or detection circuitry 228 may, for example, provide means for performing operation 610. In an instance in which it is determined that the predefined threshold connection quality condition has been satisfied, operation 620 may comprise causing a report indicating that the predefined threshold connection quality condition has been satisfied to be sent to a network node associated with the serving cell. The processor 220, memory 222, communication interface 224, and/or detection circuitry 228 may, for example, provide means for performing operation 620.

Figure 7:
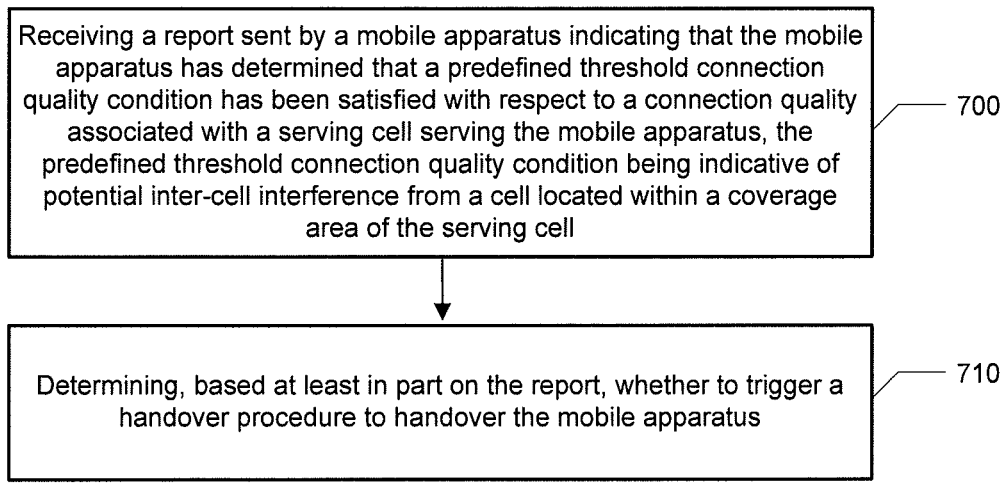
FIG. 7 illustrates a flowchart according to another example method for facilitating triggered mobility according to some example embodiments.

FIG. 7 illustrates a flowchart according to another example method for facilitating triggered mobility in accordance with some example embodiments. In this regard, FIG. 7 illustrates operations that may be performed at the network node apparatus 204. The operations illustrated in and described with respect to FIG. 7 may, for example, be performed by, with the assistance of, and/or under the control of one or more of the processor 230, memory 232, communication interface 236, or handover control circuitry 238. Operation 700 may comprise receiving a report sent by a mobile apparatus indicating that the mobile apparatus has determined that a predefined threshold connection quality condition has been satisfied with respect to a connection quality associated with a serving cell serving the mobile apparatus. The predefined threshold connection quality condition may be indicative of potential inter-cell interference from a cell located within a coverage area of the serving cell. The processor 230, memory 232, communication interface 236, and/or handover control circuitry 238 may, for example, provide means for performing operation 700. Operation 710 may comprise determining, based at least in part on the report, whether to trigger a handover procedure to handover the mobile apparatus. The processor 230, memory 232, and/or handover control circuitry 238 may, for example, provide means for performing operation 710.

FIGS. 6-7 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 222 and/or in the memory 232) and executed by a processor in the computing device (for example, by the processor 220 and/or by the processor 230). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a mobile apparatus 202 and/or a network node apparatus 204) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a mobile apparatus 202 and/or a network node apparatus 204) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 220 and/or processor 230) may provide all or a portion of the elements. In another embodiment, all or a portion of the elements may be configured by and operate under control of a computer program product. The computer program product for performing the methods of an example embodiment includes a computer-readable storage medium (for example, the memory 222 and/or memory 232), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   monitoring, at a mobile apparatus, a connection quality associated with a serving cell serving the mobile apparatus;
   determining, by a processor, based at least in part on the monitored connection quality whether a predefined threshold connection quality condition has been satisfied, the predefined threshold connection quality condition being indicative of potential inter-cell interference from a cell located within a coverage area of the serving cell, and wherein the predefined threshold quality condition defines constraints for a signal level from the serving cell and a channel quality concerning a channel transmitted from the serving cell; and
   in an instance in which it is determined that the predefined threshold connection quality condition has been satisfied, causing a report indicating that the predefined threshold connection quality condition has been satisfied to be sent to a network node associated with the serving cell.

2. The method of claim 1, wherein:
   monitoring the connection quality associated with the serving cell comprises:
      measuring a channel quality indication associated with the serving cell;
      measuring a received power level of a received signal transmitted by an access point for the serving cell; and
      comparing the measured channel quality indication to the measured received power level to determine a quality deviation between the measured channel quality indication and the measured received power level; and
   determining whether the predefined threshold connection quality condition has been satisfied comprises determining whether the determined quality deviation satisfies a predefined threshold quality deviation.

3. The method of claim 1, wherein:
   monitoring the connection quality associated with the serving cell comprises:
      measuring a first channel quality indication associated with the serving cell;
      measuring a second channel quality indication associated with the serving cell, the second channel quality indication being measured subsequent the first channel quality indication; and
      comparing the first channel quality indication to the second channel quality indication to determine a change in channel quality between the first channel quality indication and the second channel quality indication; and
   determining whether the predefined threshold connection quality condition has been satisfied comprises determining whether the change in channel quality satisfies a predefined threshold change in channel quality.

4. The method of claim 1, wherein the predefined threshold connection quality condition is configured by the serving cell.

5. The method of claim 1, further comprising:
   determining an identity of a cell potentially causing inter-cell interference; and
   including the determined identity in the report sent to the network node associated with the serving cell.

6. The method of claim 1, further comprising:
   engaging in a handover procedure handing over the mobile apparatus to the cell located within the coverage area of the serving cell, the handover procedure being triggered by the network node associated with the serving cell in response to the report.

7. The method of claim 1, wherein the serving cell comprises a macro cell, and wherein the predefined threshold connection quality condition is indicative of potential inter-cell interference from one of a microcell, pico cell, femtocell, or located within a coverage area of the serving cell.

8. An apparatus comprising at least one processor and at least one memory storing computer program code, wherein the at least one memory and stored computer program code are configured, with the at least one processor, to cause the apparatus to at least:
   monitor a connection quality associated with a serving cell serving the apparatus;
   determine based at least in part on the monitored connection quality whether a predefined threshold connection quality condition has been satisfied, the predefined threshold connection quality condition being indicative of potential inter-cell interference from a cell located within a coverage area of the serving cell, and wherein the predefined threshold quality condition defines constraints for a signal level from the serving cell and a channel quality concerning a channel transmitted from the serving cell; and
   in an instance in which it is determined that the predefined threshold connection quality condition has been satisfied, cause a report indicating that the predefined threshold connection quality condition has been satisfied to be sent to a network node associated with the serving cell.

9. The apparatus of claim 8, wherein the at least one memory and stored computer program code are configured, with the at least one processor, to cause the apparatus to:
   monitor the connection quality associated with the serving cell at least in part by:
      measuring a channel quality indication associated with the serving cell;
      measuring a received power level of a received signal transmitted by an access point for the serving cell; and
      comparing the measured channel quality indication to the measured received power level to determine a quality deviation between the measured channel quality indication and the measured received power level; and
   determine whether the predefined threshold connection quality condition has been satisfied at least in part by determining whether the determined quality deviation satisfies a predefined threshold quality deviation.

10. The apparatus of claim 8, wherein the at least one memory and stored computer program code are configured, with the at least one processor, to cause the apparatus to:
    monitor the connection quality associated with the serving cell at least in part by:
       measuring a first channel quality indication associated with the serving cell;
       measuring a second channel quality indication associated with the serving cell, the second channel quality indication being measured subsequent the first channel quality indication; and
       comparing the first channel quality indication to the second channel quality indication to determine a change in channel quality between the first channel quality indication and the second channel quality indication; and determine whether the predefined threshold connection quality condition has been satisfied at least in part by determining whether the change in channel quality satisfies a predefined threshold change in channel quality.

11. The apparatus of claim 8, wherein the predefined threshold connection quality condition is configured by the serving cell.

12. The apparatus of claim 8, wherein the at least one memory and stored computer program code are configured, with the at least one processor, to further cause the apparatus to:

determine an identity of a cell potentially causing inter-cell interference; and include the determined identity in the report sent to the network node associated with the serving cell.

13. The apparatus of claim 8, wherein the at least one memory and stored computer program code are configured, with the at least one processor, to further cause the apparatus to:

engage in a handover procedure handing over the apparatus to the cell located within the coverage area of the serving cell, the handover procedure being triggered by the network node associated with the serving cell in response to the report.

14. The apparatus of claim 8, wherein the apparatus comprises or is embodied on a mobile phone, the mobile phone comprising user interface circuitry and user interface software stored on one or more of the at least one memory; wherein the user interface circuitry and user interface software are configured to:

facilitate user control of at least some functions of the mobile phone through use of a display; and cause at least a portion of a user interface of the mobile phone to be displayed on the display to facilitate user control of at least some functions of the mobile phone.

15. An apparatus comprising at least one processor and at least one memory storing computer program code, wherein the at least one memory and stored computer program code are configured, with the at least one processor, to cause the apparatus to at least:

receive a report sent by a mobile apparatus indicating that the mobile apparatus has determined that a predefined threshold connection quality condition has been satisfied with respect to a connection quality associated with a serving cell serving the mobile apparatus, the predefined threshold connection quality condition being indicative of potential inter-cell interference from a cell located within a coverage area of the serving cell, and wherein the predefined threshold quality condition defines constraints for a signal level from the serving cell and a channel quality concerning a channel transmitted from the serving cell; and determine, based at least in part on the report, whether to trigger a handover procedure to handover the mobile apparatus.

16. The apparatus of claim 15, wherein the at least one memory and stored computer program code are configured, with the at least one processor, to further cause the apparatus to configure the predefined threshold connection quality condition for the mobile apparatus.

17. The apparatus of claim 15, wherein the at least one memory and stored computer program code are configured, with the at least one processor, to further cause the apparatus to:

verify, in response to the report, that the mobile apparatus is encountering inter-cell interference; and determine to trigger the handover procedure in an instance in which it is verified that the apparatus is encountering inter-cell interference.

18. The apparatus of claim 17, wherein the at least one memory and stored computer program code are configured, with the at least one processor, to further cause the apparatus to:

determine a location of the mobile apparatus; and verify that the mobile apparatus is encountering inter-cell interference at least in part by determining whether the mobile apparatus is located within proximity of a known location of a cell located within the coverage area of the serving cell.

19. The apparatus of claim 17, wherein the report includes a connection quality value measured by the mobile apparatus, and wherein the at least one memory and stored computer program code are configured, with the at least one processor, to further cause the apparatus to:

verify that the mobile apparatus is encountering inter-cell interference at least in part by determining whether the reported connection quality value deviates by more than a threshold amount from an expected connection quality value based at least in part on statistical data collected for the serving cell.

20. The apparatus of claim 15, wherein the apparatus comprises or is embodied on a network node associated with the serving cell.

* * * * *